(12) United States Patent
van Balveren et al.

(10) Patent No.: US 9,296,442 B2
(45) Date of Patent: Mar. 29, 2016

(54) CARRIER RACK ADAPTER KIT FOR ADAPTING A LUGGAGE CARRIER RACK OF A BICYCLE

(71) Applicant: Invented Here B.V., Ulft (NL)

(72) Inventors: Marthijn Marinus Gerardus Henrikus van Balveren, Ulft (NL); Wouter de Boer, Ulft (NL); Sander Leon de Wit, Ulft (NL); Libbe Homme Adema, Ulft (NL)

(73) Assignee: INVENTED HERE B.V., Ulft (NL)

( * ) Notice: Subject to any disclaimer, the term of this patent is extended or adjusted under 35 U.S.C. 154(b) by 0 days.

(21) Appl. No.: 14/755,987

(22) Filed: Jun. 30, 2015

(65) Prior Publication Data

US 2016/0001838 A1 Jan. 7, 2016

(30) Foreign Application Priority Data

Jul. 1, 2014 (DE) .......................... 10 2014 009 766

(51) Int. Cl.
*B62J 7/04* (2006.01)
*B62J 11/00* (2006.01)

(52) U.S. Cl.
CPC ... *B62J 11/00* (2013.01); *B62J 7/04* (2013.01)

(58) Field of Classification Search
CPC .......................................................... B62J 7/04
USPC ....................................................... 224/42.4
See application file for complete search history.

(56) References Cited

U.S. PATENT DOCUMENTS

| 4,125,213 | A | * | 11/1978 | Watkins | B62J 9/00 224/413 |
| 4,325,531 | A | * | 4/1982 | Omholt | B62J 9/00 224/42.4 |
| 5,562,322 | A | * | 10/1996 | Christoffel | B60N 2/01583 248/503.1 |
| 5,730,414 | A | * | 3/1998 | Wenger | B62D 25/2072 224/42.32 |
| 5,806,735 | A | * | 9/1998 | Christiansson | B60R 9/045 224/319 |
| 7,258,260 | B2 | * | 8/2007 | Hurd | B60R 9/055 224/319 |

(Continued)

FOREIGN PATENT DOCUMENTS

BE 804127 A1 12/1973
DE 29617253 U1 2/1997

(Continued)

OTHER PUBLICATIONS

Search Report mailed Apr. 13, 2015, from German Application No. 10 2014 009 766.8 (15 pages).
Extended European Search report and European Search Opinion for European Patent Application No. 15174567.6 mailed on Nov. 3, 2015, 4 pages.

*Primary Examiner* — Justin Larson
(74) *Attorney, Agent, or Firm* — Kilpatrick Townsend & Stockton LLP

(57) ABSTRACT

In a carrier rack adapter kit for adapting a luggage carrier rack of a bicycle, a fastening bolt is extending via a first passageway through an auxiliary luggage carrier structure, via a second passageway through a first rod clamping head, and via a third passageway through a second rod clamping head. In reaction to a tightening action on the fastening bolt, shear forces along first and second inclined outer surface portions of the first and second rod clamping heads are urging the rod clamping heads to move towards one another. The carrier rack adapter kit allows for universal, easy and quick mounting of an auxiliary luggage carrier structure above luggage carrier racks of various configurations and various dimensions.

5 Claims, 4 Drawing Sheets

(56) References Cited

U.S. PATENT DOCUMENTS

| | | | | |
|---|---|---|---|---|
| 7,775,411 B2 * | 8/2010 | Campbell | ............... | B62J 7/04 224/42.4 |
| 8,360,288 B2 * | 1/2013 | Shih | ...................... | B62J 7/00 224/42.4 |
| 8,393,508 B2 * | 3/2013 | Sautter | ................ | B60R 9/055 224/321 |

FOREIGN PATENT DOCUMENTS

| | | |
|---|---|---|
| DE | 202013101143 U1 | 3/2013 |
| FR | 2832690 A3 | 5/2003 |
| GB | 2175039 A | 11/1986 |
| NL | 9101921 A | 6/1993 |

\* cited by examiner

CARRIER RACK ADAPTER KIT FOR ADAPTING A LUGGAGE CARRIER RACK OF A BICYCLE

This application claims priority to German Patent Application No. 10 2014 009 766.8, filed Jul. 1, 2014, the disclosure of which is incorporated by reference herein.

The invention relates to a carrier rack adapter kit for adapting a luggage carrier rack of a bicycle.

Luggage carrier racks of bicycles exist in various types as regards their configurations and dimensions.

The basic structure of many of these luggage carrier racks has two mutually parallel main rod segments, hereinafter indicated as "side rods", which are transversely interconnected by a number of thinner and shorter rods, hereinafter indicated as "transverse rods".

These carrier racks are used for various purposes, such as for carrying a luggage container, for example a basket, or, in case of an electrical bicycle, for carrying a battery pack.

When fixing, for example, a basket to an existing carrier rack of a bicycle, the basket is susceptible to deformation due to the forces occurring between the bottom of the basket and the side rods of the carrier rack.

A battery pack of an electrical bicycle often is permanently placed on the transverse rods of the carrier rack, usually in an area in-between the side rods of the carrier rack. When a battery pack is placed on the carrier rack, there generally is a need for storing luggage above the battery pack.

It is an object of the invention to provide a solution according to which an auxiliary luggage carrier structure, such as for example a strong plate, can easily and quickly be mounted above luggage carrier racks, more particularly in a universal sense for carrier racks of various configurations and various dimensions.

For that purpose, the invention provides a carrier rack adapter kit according to the appended independent claim 1, while specific embodiments of the invention are set forth in the appended dependent claims 2-5.

Hence, the invention provides a carrier rack adapter kit for adapting a luggage carrier rack of a bicycle, said carrier rack adapter kit comprising:

an auxiliary luggage carrier structure for being mounted above the luggage carrier rack;

at least one rod clamping assembly for clamping a rod of the luggage carrier rack, said rod clamping assembly comprising a first rod clamping head and a second rod clamping head, comprising a first rod clamping outer surface portion and a second rod clamping outer surface portion, respectively, said rod clamping assembly being configured for clamping said rod in-between the first rod clamping outer surface portion and the second rod clamping outer surface portion; and at least one fastening bolt having a longitudinal bolt direction;

wherein, in assembled condition of the carrier rack adapter kit:

the fastening bolt is holding the auxiliary luggage carrier structure and the rod clamping assembly together in such manner that:

the first rod clamping head is held at least partly in-between the auxiliary luggage carrier structure and the second rod clamping head;

the fastening bolt is extending via a first passageway through the auxiliary luggage carrier structure, via a second passageway through the first rod clamping head, and via a third passageway through the second rod clamping head, wherein (i) the second passageway allows for relative movement between the fastening bolt and the first rod clamping head in a direction perpendicular to the longitudinal bolt direction, and/or (ii) the third passageway allows for relative movement between the fastening bolt and the second rod clamping head in a direction perpendicular to the longitudinal bolt direction; and the first rod clamping head and the second rod clamping head further comprise a first inclined outer surface portion and a second inclined outer surface portion, respectively, which are facing one another, and which are having respective inclinations relative to a reference plane which is perpendicular to the longitudinal bolt direction, whereby, in reaction to a tightening action on the fastening bolt, shear forces along said first inclined outer surface portion and said second inclined outer surface portion are urging the first rod clamping head and the second rod clamping head to move relative to one another in an inclined direction relative to said reference plane, thereby urging the first rod clamping outer surface portion of the first rod clamping head and the second rod clamping outer surface portion of the second rod clamping head to perform a first relative movement towards one another.

Hence, if the first and second clamping heads are placed over a carrier rack's rod of arbitrary cross-sectional size, operating the fastening bolt, which includes tightening it, not only fastens the auxiliary luggage carrier structure to the clamping head assembly, but at the same time also fastens the clamping head assembly to the arbitrarily sized rod, in a manner tailored to the size of the rod. So, these multiple tasks require only one single operation. Accordingly, the carrier rack adapter kit according to the invention offers a universally, easily and quickly usable solution for mounting an auxiliary luggage carrier structure above various types of luggage carrier racks.

A preferable embodiment of a carrier rack adapter kit according to the invention is characterized in that, in said assembled condition, for at least one single such rod clamping assembly one and only one of such a fastening bolt is holding the auxiliary luggage carrier structure and the rod clamping assembly together in the said manner. Thus, if one and only one of such a fastening bolt is associated with one single such rod clamping assembly, or, in case the carrier rack adapter kit has more than one rod clamping assemblies, if one and only one of such a fastening bolt is associated per one single such rod clamping assembly, then the ease and speed of mounting an auxiliary luggage carrier structure above various types of luggage carrier racks is further improved.

A further preferable embodiment of a carrier rack adapter kit according to the invention is characterized in that, in said assembled condition, the first passageway through the auxiliary luggage carrier structure allows for a second relative movement between the fastening bolt and the auxiliary luggage carrier structure in a direction perpendicular to the longitudinal bolt direction. For example, as seen in said assembled condition in a view parallel to the longitudinal bolt direction, the first passageway may comprise a slot. This further feature adds a yet further task to the abovementioned multiple tasks requiring only one single operation. That is, the first passageway (e.g. a slot, as mentioned) adds the possibility of adjusting the relative position between the auxiliary luggage carrier structure and the clamping head assembly in the said direction perpendicular to the longitudinal bolt direction.

According to a further preferable embodiment of the invention, the carrier rack adapter kit further comprises at least one spacer for placement, in said assembled condition, in-between the auxiliary luggage carrier structure and the rod clamping assembly. If desired, such at least one spacer may be used for accommodating various height differences between the auxiliary luggage carrier structure and the luggage carrier rack.

Preferably, the spacer, as seen in said assembled condition in a view along the longitudinal bolt direction, has a U-shaped form, the space in-between the two free ends of the two legs of the U-shaped form allowing the fastening bolt to pass therebetween in a direction perpendicular to the longitudinal bolt direction. This allows for assembling and disassembling of the spacer relative to an already assembled carrier rack adapter kit, without needing to disassemble the fastening bolt from the already assembled carrier rack adapter kit.

The abovementioned aspects and other aspects of the invention will be apparent from and elucidated with reference to the embodiments described hereinafter by way of non-limiting examples only and with reference to the schematic figures in the enclosed drawing.

Figure 3:
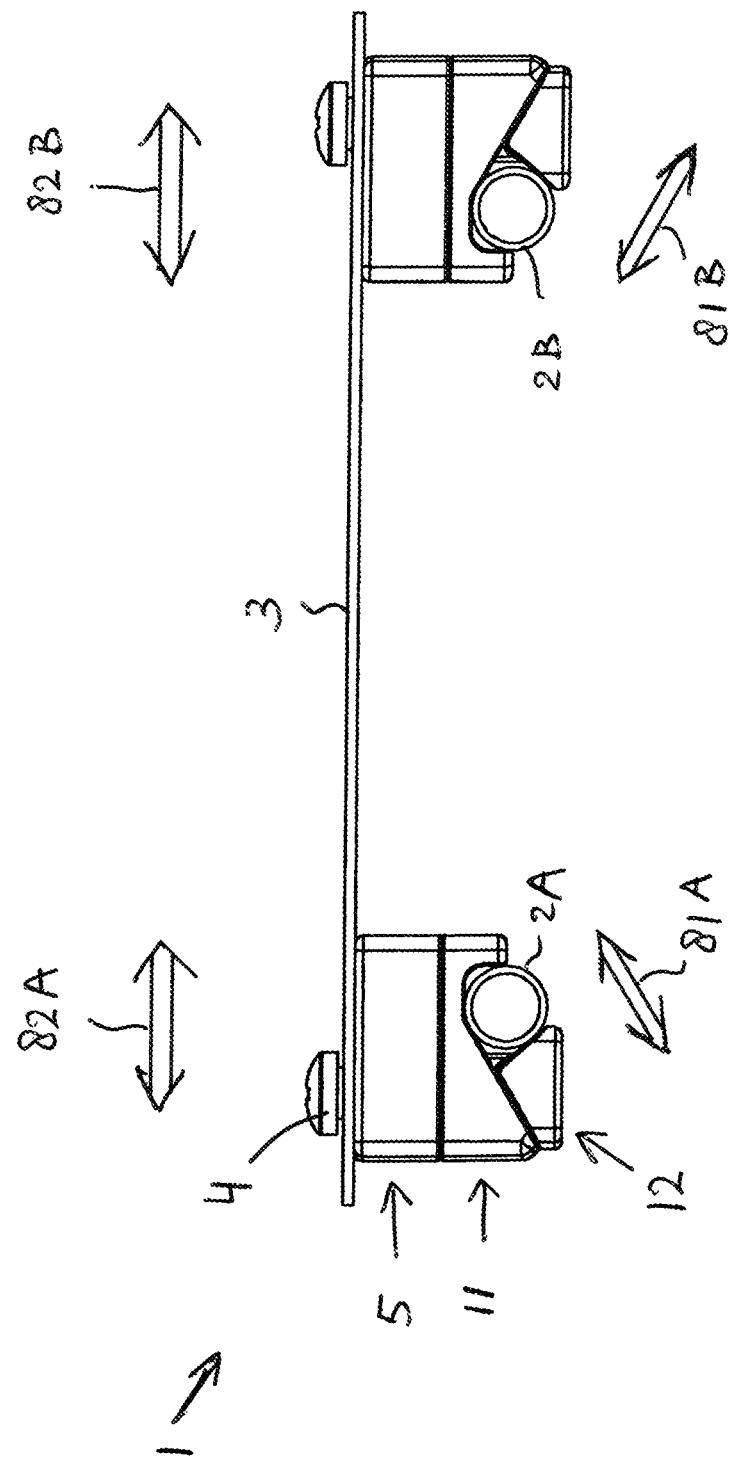
FIG. 3 shows the carrier rack adapter kit with the two side rods of FIGS. 1 and 2 again, however this time in a side view in a direction parallel to the longitudinal directions of the side rods, and in an assembled condition of the carrier rack adapter kit being mounted to the two side rods.
Figure 4:
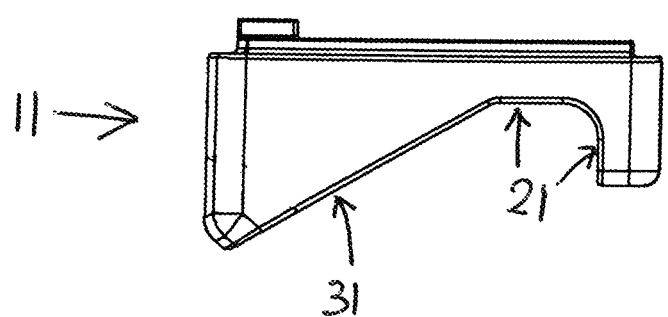

FIG. 4 separately shows, in the same side view as in FIG. 3, the first rod clamping head of the leftmost rod clamping assembly of the carrier rack adapter kit of FIG. 3.

Figure 5:
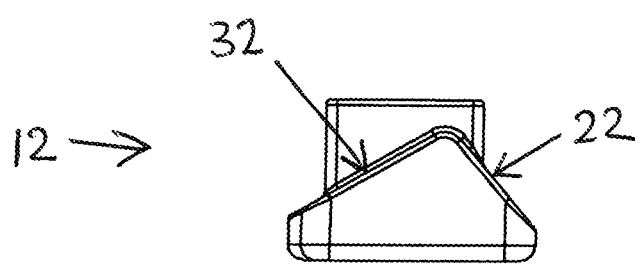

FIG. 5 separately shows, in the same side view as in FIG. 3, the second rod clamping head of the leftmost rod clamping assembly of the carrier rack adapter kit of FIG. 3.

Figure 1:
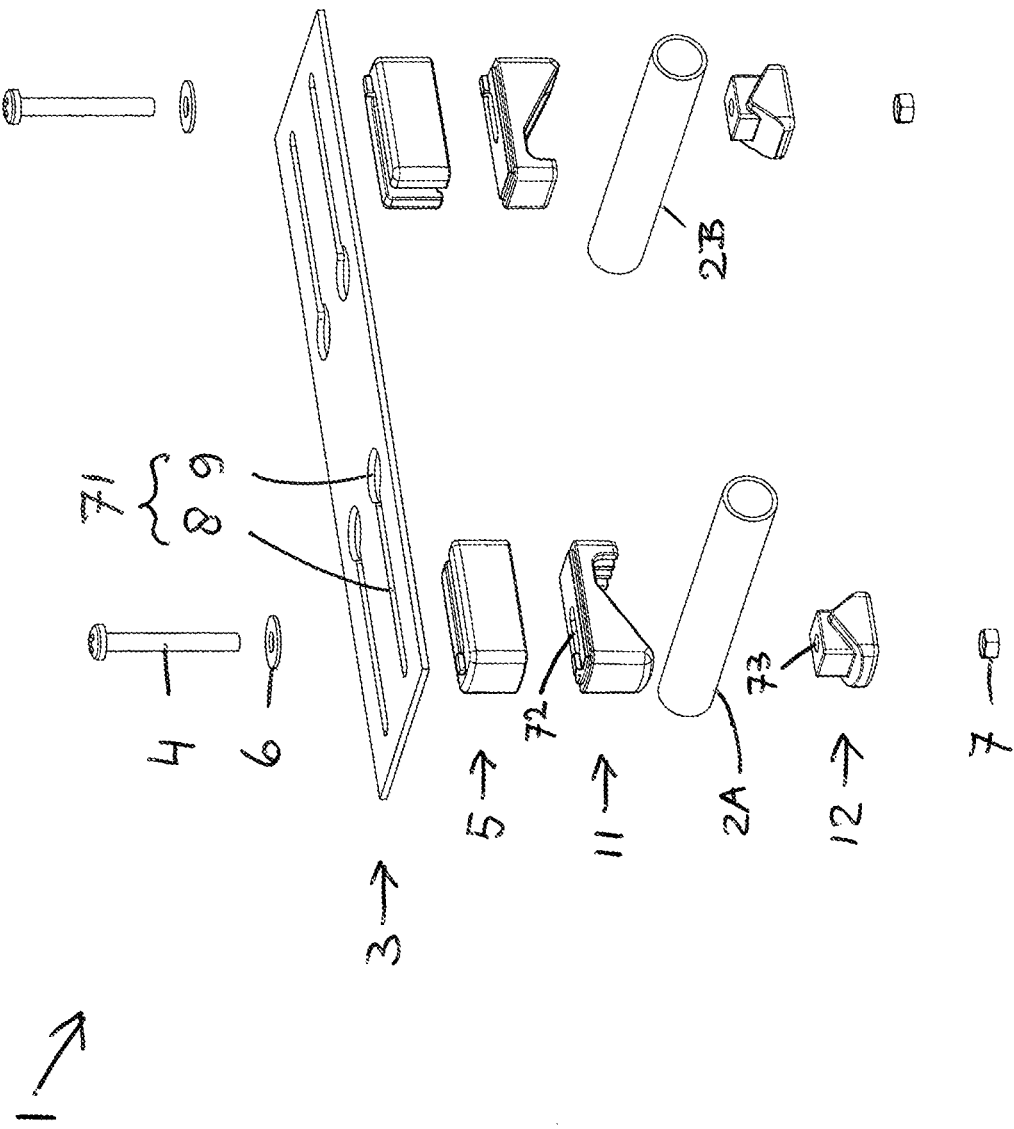
FIG. 1 shows, in a perspective view taken partly from above, an example of an embodiment of a carrier rack adapter kit according to the invention in an exploded view, as well as two parallel side rods of a luggage carrier rack of a bicycle.
Figure 2:
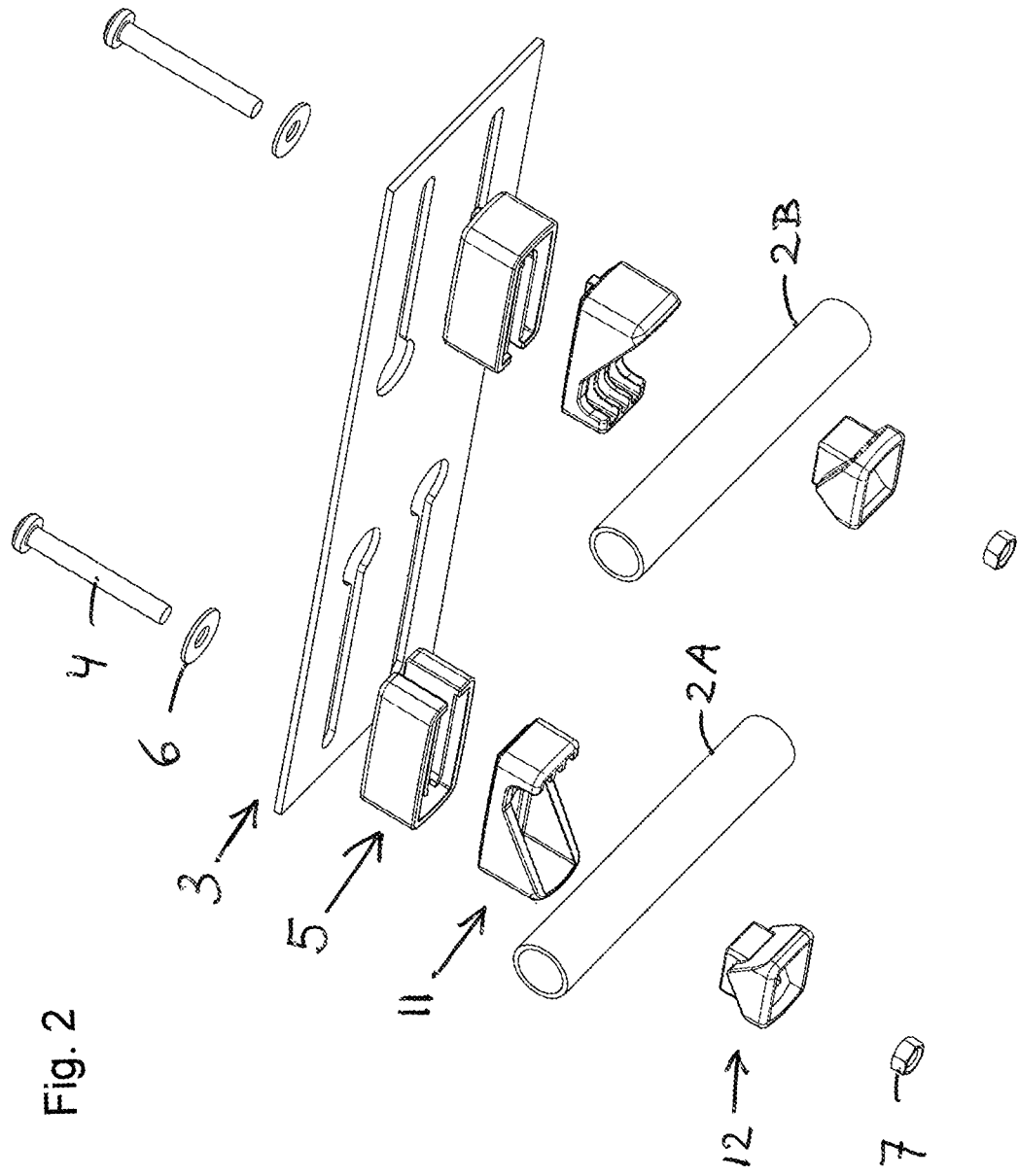
FIG. 2 shows the situation of FIG. 1 again, however, wherein the perspective view this time is taken partly from below.

In the shown example, the carrier rack adapter kit is indicated by reference numeral 1, while the two parallel side rods of the luggage carrier rack are indicated by reference numerals 2A and 2B. In FIGS. 1-3 it is seen that the carrier rack adapter kit 1 comprises one auxiliary luggage carrier structure, in this case the shown carrier plate 3. Furthermore, the first rod clamping head, the second rod clamping head, the fastening bolt, and the spacer, all as mentioned above, have been indicated by reference numerals 11, 12, 4, and 5, respectively. The abovementioned first, second, and third passageways are indicated by the numerals 71, 72, and 73, respectively. The fastening bolt 4 is a screw bolt, which in the shown example is fastened by means of a nut 7. The first passageway 71 in the carrier plate 3 is mainly formed as a slot 8, as seen when viewing at the carrier plate 3 in the longitudinal bolt direction of the screw bolt 4. In the assembled condition, a washer 6 is placed between the head of screw bolt 4 and the carrier plate 3. If, in the assembled condition, the screw bolt 4 is not fully tightened, the slot 8 allows for relative reciprocating movements 82A between the screw bolt 4 and the carrier plate 3 along the length of the slot 8, see FIG. 3, which movements are in directions perpendicular to the longitudinal bolt direction. Note that in the shown example, the first passageway 71, at an end of slot 8, ends in a circular opening 9 being a bit larger than washer 6. If the screw bolt 4 is sided within the first passageway 71 into a position coaxial with the circular opening 9, it is possible to disassemble the carrier plate 3 from the other parts of the kit 1, without having to disassemble the screw bolt 4.

It is remarked that the configurations of FIGS. 1, 2 and 3 are each symmetrical relative to a straight mirror plane, which mirror plane is parallel to the longitudinal direction of the screw bolt 4 and parallel to the longitudinal direction of the side rod 2A. More in particular it is noted that, in the shown example, the carrier plate 3 in itself is symmetrical relative to said mirror plane, while all other parts of the kit 1, as well as the two side rods 2A and 2B of the carrier rack of the bicycle, are each present in duplicate in the said symmetrical sense.

It is seen that in the shown example one and only fastening bolt 4 is holding the auxiliary luggage carrier structure 3 and the rod clamping assembly 11, 12 together in the said manner.

Furthermore, it is seen that in the shown example the spacer 5 has the abovementioned U-shaped form.

Similar to the first passageway 71, the second passageway 72 allows for relative movement between the fastening bolt 4 and the first rod clamping head 11 in a direction perpendicular to the longitudinal bolt direction. This is realized in that the second passageway 72 is mainly formed as a slot 72, as seen when viewing at the first rod clamping head 11 in the longitudinal bolt direction of the screw bolt 4. However, in the shown example, the third passageway 73 in the second rod clamping head 12 is not formed as a slot, but has a circularly cylindrical shape having a diameter which is just large enough for receiving the screw bolt 4.

As shown in FIG. 4, the abovementioned first rod clamping outer surface portion and first inclined outer surface portion of the first rod clamping head 11 are indicated by reference numerals 21 and 31, respectively. Similarly, FIG. 5 shows that the abovementioned second rod clamping outer surface portion and second inclined outer surface portion of the second rod clamping head 12 are indicated by reference numerals 22 and 32, respectively.

Assembling the carrier rack adapter kit 1 may for example be done as follows. A user may first pre-assemble the kit 1, by only partly operating the screw bolt 4, to obtain a very loose fit of all parts of the kit 1. In that loose fit, the first and second clamping heads 11 and 12 may easily be sided over the rod 2A. Also, in that loose fit, the carrier plate 3 may still easily be sided relative to the screw bolt 4 according to the reciprocating movements 82A. Next, the user may further tighten the screw bolt 7. In reaction to the tightening action on the screw bolt 4, shear forces along the first inclined outer surface portion 31 and the second inclined outer surface portion 32 are urging the first rod clamping head 11 and the second rod clamping head 12 to move relative to one another in the inclined direction that corresponds to the two-way arrow indicated by reference numeral 81A in FIG. 3. Thereby, the first rod clamping outer surface portion 21 of the first rod clamping head 11 and the second rod clamping outer surface portion 22 of the second rod clamping head 12 are urged to perform said first relative movement 81A towards one another.

FIG. 3 shows that the first relative movement 81A and the second relative movement 82A indicated by means of two-way arrows on the left-hand side of FIG. 3 have corresponding mirror counterparts 81B and 82B, respectively, on the right-hand side of FIG. 3.

It will now be readily appreciated that, thanks to the explained first and second relative movement 81A, 81B, 82A, 82B, the kit 1 is suitable for easy and quick mounting of the carrier plate 3 to different pairs of side rods, having differently sized side rods and with different lateral distances relative to one another. Note that in the situation of FIG. 3, for example a battery pack may be accommodated between the two side rods 2A and 2B, and above the transverse rods (not shown) of the carrier rack, and below the carrier plate 3 of the kit 1. Then the carrier plate 3 may be used to carry luggage.

While the invention has been described and illustrated in detail in the foregoing description and in the drawing figures, such description and illustration are to be considered exemplary and/or illustrative and not restrictive; the invention is not limited to the disclosed embodiments.

For example, in addition to or as an alternative for clamping on one or more side rods of a carrier rack, the at least one rod clamping assembly of a kit according to the invention may also clamp on one or more transverse rods of a carrier rack, and/or on any other part of a carrier rack.

Also, various other auxiliary luggage carrier structures may be applied in a kit according to the invention. For example, the auxiliary luggage carrier structure may even be a complete luggage container, such as a basket, wherein the first passageway is extending through the bottom of the luggage container/basket.

Furthermore, if a screw bolt, such as the shown screw bolt 4, is used as fastening bolt, it is of course not necessary to use a corresponding nut, such as the shown nut 7. Instead, the third passageway 73 in the second rod clamping head 12 could be provided with internal screw thread for co-operation with the external screw thread of the screw bolt 4. Also, instead of a screw bolt, various other fastening bolts may be applied.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single item may fulfill the functions of several items recited in the claims. For the purpose of clarity and a concise description, features are disclosed herein as part of the same or separate embodiments, however, it will be appreciated that the scope of the invention may include embodiments having combinations of all or some of the features disclosed. The mere fact that certain measures are recited in mutually different dependent claims does not indicate that a combination of these measures can not be used to advantage. Any reference signs in the claims should not be construed as limiting the scope.

The invention claimed is:

1. A carrier rack adapter kit for adapting a luggage carrier rack of a bicycle, said carrier rack adapter kit comprising:
   an auxiliary luggage carrier structure for being mounted above the luggage carrier rack;
   at least one rod clamping assembly for clamping a rod of the luggage carrier rack, said rod clamping assembly comprising a first rod clamping head and a second rod clamping head, comprising a first rod clamping outer surface portion and a second rod clamping outer surface portion, respectively, said rod clamping assembly being configured for clamping said rod in-between the first rod clamping outer surface portion and the second rod clamping outer surface portion; and
   at least one fastening bolt having a longitudinal bolt direction;
   wherein, in assembled condition of the carrier rack adapter kit:
   the fastening bolt is holding the auxiliary luggage carrier structure and the rod clamping assembly together in such manner that:
   the first rod clamping head is held at least partly in-between the auxiliary luggage carrier structure and the second rod clamping head;
   the fastening bolt is extending via a first passageway through the auxiliary luggage carrier structure, via a second passageway through the first rod clamping head, and via a third passageway through the second rod clamping head, wherein (i) the second passageway allows for relative movement between the fastening bolt and the first rod clamping head in a direction perpendicular to the longitudinal bolt direction, and/or (ii) the third passageway allows for relative movement between the fastening bolt and the second rod clamping head in a direction perpendicular to the longitudinal bolt direction; and
   the first rod clamping head and the second rod clamping head further comprise a first inclined outer surface portion and a second inclined outer surface portion, respectively, which are facing one another, and which are having respective inclinations relative to a reference plane which is perpendicular to the longitudinal bolt direction, whereby, in reaction to a tightening action on the fastening bolt, shear forces along said first inclined outer surface portion and said second inclined outer surface portion are urging the first rod clamping head and the second rod clamping head to move relative to one another in an inclined direction relative to said reference plane, thereby urging the first rod clamping outer surface portion of the first rod clamping head and the second rod clamping outer surface portion of the second rod clamping head to perform a first relative movement towards one another.

2. The carrier rack adapter kit according to claim 1, wherein, in said assembled condition, for at least one single such rod clamping assembly one and only one of such a fastening bolt is holding the auxiliary luggage carrier structure and the rod clamping assembly together in the said manner.

3. The carrier rack adapter kit according to claim 1, wherein, in said assembled condition, the first passageway through the auxiliary luggage carrier structure allows for a second relative movement between the fastening bolt and the auxiliary luggage carrier structure in a direction perpendicular to the longitudinal bolt direction.

4. The carrier rack adapter kit according to claim 1, further comprising at least one spacer for placement, in said assembled condition, in-between the auxiliary luggage carrier structure and the rod clamping assembly.

5. The carrier rack adapter kit according to claim 4, wherein the spacer, as seen in said assembled condition in a view along the longitudinal bolt direction, has a U-shaped form, the space in-between the two free ends of the two legs of the U-shaped form allowing the fastening bolt to pass therebetween in a direction perpendicular to the longitudinal bolt direction.

* * * * *